United States Patent
Baek et al.

(10) Patent No.: US 11,403,512 B2
(45) Date of Patent: Aug. 2, 2022

(54) APPARATUS AND METHOD FOR DETECTING BROADCAST SIGNAL

(71) Applicant: ELECTRONICS AND TELECOMMUNICATIONS RESEARCH INSTITUTE, Daejeon (KR)

(72) Inventors: Myung-Sun Baek, Daejeon (KR); Jin-Hyuk Song, Daejeon (KR); Byung-Jun Bae, Daejeon (KR); Dong-Joon Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 342 days.

(21) Appl. No.: 16/869,981

(22) Filed: May 8, 2020

(65) Prior Publication Data

US 2021/0110238 A1   Apr. 15, 2021

(30) Foreign Application Priority Data

Oct. 15, 2019  (KR) .......................... 10-2019-0127746

(51) Int. Cl.
```
G06K 9/00      (2022.01)
G06N 3/04      (2006.01)
G06N 3/08      (2006.01)
H04L 12/18     (2006.01)
H04L 27/00     (2006.01)
G06N 20/00     (2019.01)
```
(52) U.S. Cl.
CPC ............. *G06N 3/0454* (2013.01); *G06N 3/08* (2013.01); *G06N 20/00* (2019.01); *H04L 12/1845* (2013.01); *H04L 27/0012* (2013.01)

(58) Field of Classification Search
CPC ........ G06N 3/0454; G06N 3/08; G06N 20/00; H04L 12/1845; H04L 27/0012; H04N 21/4382; H04N 5/455; H04N 21/42676; H04N 21/4432
See application file for complete search history.

(56) References Cited

U.S. PATENT DOCUMENTS

| | | | |
|---|---|---|---|
| 10,043,285 B2 | 8/2018 | Kim | |
| 10,637,595 B2 | 4/2020 | Yang et al. | |
| 11,334,807 B1 * | 5/2022 | O'Shea | ................ H04B 17/309 |

(Continued)

FOREIGN PATENT DOCUMENTS

| | | |
|---|---|---|
| KR | 10-1429965 B1 | 9/2014 |
| KR | 10-2016-0116334 A | 10/2016 |
| KR | 10-1944678 B1 | 4/2019 |

*Primary Examiner* — Dhaval V Patel
(74) *Attorney, Agent, or Firm* — Rabin & Berdo, P.C.

(57) ABSTRACT

Disclosed herein are an apparatus and method for detecting a broadcast signal. The apparatus includes a bootstrap detection unit for detecting whether a bootstrap signal is included in a received broadcast signal based on a preset first bootstrap window and a machine-learning method, a bootstrap offset estimation unit for searching the broadcast signal for the start point of the bootstrap signal using a preset second bootstrap window, estimating a bootstrap offset based on the machine-learning method, and estimating bootstrap symbols from the bootstrap offset, and a demodulation unit for demodulating information included in the broadcast signal from the bootstrap symbols based on the machine-learning method.

10 Claims, 12 Drawing Sheets

(56) References Cited

U.S. PATENT DOCUMENTS

| | | | |
|---|---|---|---|
| 2017/0214964 A1* | 7/2017 | Kim | H04N 21/4302 |
| 2018/0145864 A1* | 5/2018 | Atungsiri | H04L 27/2621 |
| 2019/0109736 A1 | 4/2019 | Yaman et al. | |
| 2019/0135303 A1 | 5/2019 | Kim et al. | |

* cited by examiner

APPARATUS AND METHOD FOR DETECTING BROADCAST SIGNAL

CROSS REFERENCE TO RELATED APPLICATION

This application claims the benefit of Korean Patent Application No. 10-2019-0127746, filed Oct. 15, 2019, which is hereby incorporated by reference in its entirety into this application.

BACKGROUND OF THE INVENTION

1. Technical Field

The present invention relates generally to technology for detecting a broadcast signal, and more particularly to technology for detecting a broadcast signal using machine-learning.

2. Description of the Related Art

A bootstrap signal is designed in order to announce the presence of a broadcast signal to a receiver and to transmit information for demodulating the preamble of a data frame located immediately after the bootstrap signal. The receiver is able to demodulate the preamble of the frame using the information acquired from the bootstrap signal, and pieces of information transmitted using the preamble enable demodulation of the OFDM symbols of a subframe transmitted immediately after the preamble. Also, wakeup bits carried by the bootstrap signal serve to wake up the receiver in the event of a disaster, thereby enabling the receiver to receive disaster information. In consideration of these characteristics, the bootstrap signal was designed to be detected even in a poor Signal-to-Noise Ratio (SNR) environment of about -6 dB when the standards therefor were set forth.

Meanwhile, Korean Patent Application Publication No. 10-2016-0116334, titled "broadcast signal transmission device, broadcast signal reception device, broadcast signal transmission method, and broadcast signal reception method", discloses a system capable of supporting next-generation broadcast services in an environment in which a next-generation hybrid broadcast using a terrestrial broadcast network and the internet network is supported.

SUMMARY OF THE INVENTION

An object of the present invention is to provide detection of a bootstrap signal, estimation of a bootstrap offset, and demodulation of information in an effective manner.

In order to accomplish the above object, an apparatus for detecting a broadcast signal according to an embodiment of the present invention includes a bootstrap detection unit for detecting whether a bootstrap signal is included in a received broadcast signal based on a preset first bootstrap window and a machine-learning method, a bootstrap offset estimation unit for searching the broadcast signal for the start point of the bootstrap signal using a preset second bootstrap window, estimating a bootstrap offset based on the machine-learning method, and estimating bootstrap symbols from the bootstrap offset, and a demodulation unit for demodulating information included in the broadcast signal from the bootstrap symbols based on the machine-learning method.

Here, the bootstrap detection unit may separate a complex signal corresponding to the broadcast signal into a real part and an imaginary part and may output information about whether the bootstrap signal is included in the broadcast signal based on a result of applying inputs of the real part and the imaginary part to the machine-learning network, which is any one of a deep neural network (DNN) and a convolution neural network (CNN).

Here, the bootstrap offset estimation unit may separate a complex signal corresponding to the broadcast signal into a real part and an imaginary part and may estimate the bootstrap offset from the broadcast signal based on a result of applying inputs of the real part and the imaginary part to the machine-learning network, which is any one of a deep neural network (DNN) and a convolution neural network (CNN).

Here, the bootstrap offset estimation unit may estimate a first bootstrap symbol and a second bootstrap symbol, among the bootstrap symbols that include the information included in the broadcast signal, based on the bootstrap offset.

Here, the demodulation unit may separate the first bootstrap symbol into a real part and an imaginary part, may separate the second bootstrap symbol into a real part and an imaginary part, and may demodulate the information included in the broadcast signal based on a result of applying inputs of real parts and imaginary parts of the first bootstrap symbol and the second bootstrap symbol to the machine-learning network, which is any one of a deep neural network (DNN) and a convolution neural network (CNN).

Also, in order to accomplish the above object, a method for detecting a broadcast signal, performed by an apparatus for detecting the broadcast signal, according to an embodiment of the present invention includes detecting whether a bootstrap signal is included in a received broadcast signal based on a preset first bootstrap window and a machine-learning method; searching the broadcast signal for the start point of the bootstrap signal using a preset second bootstrap window, estimating a bootstrap offset based on the machine-learning method, and estimating bootstrap symbols from the bootstrap offset; and demodulating the information included in the broadcast signal from the bootstrap symbols based on the machine-learning method.

Here, detecting whether the bootstrap signal is included may be configured to separate a complex signal corresponding to the broadcast signal into a real part and an imaginary part and to output information about whether the bootstrap signal is included in the broadcast signal based on a result of applying inputs of the real part and the imaginary part to the machine-learning network, which is any one of a deep neural network (DNN) and a convolution neural network (CNN).

Here, estimating the bootstrap offset may be configured to separate a complex signal corresponding to the broadcast signal into a real part and an imaginary part and to estimate the bootstrap offset from the broadcast signal based on a result of applying inputs of the real part and the imaginary part to the machine-learning network, which is any one of a deep neural network (DNN) and a convolution neural network (CNN).

Here, estimating the bootstrap symbols may be configured to estimate a first bootstrap symbol and a second bootstrap symbol, among the bootstrap symbols that include the information included in the broadcast signal, based on the bootstrap offset.

Here, demodulating the information may be configured to separate the first bootstrap symbol into a real part and an imaginary part, to separate the second bootstrap symbol into a real part and an imaginary part, and to demodulate the information included in the broadcast signal based on a result of applying inputs of real parts and imaginary parts of the first bootstrap symbol and the second bootstrap symbol to the machine-learning network, which is any one of a deep neural network (DNN) and a convolution neural network (CNN).

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 1:
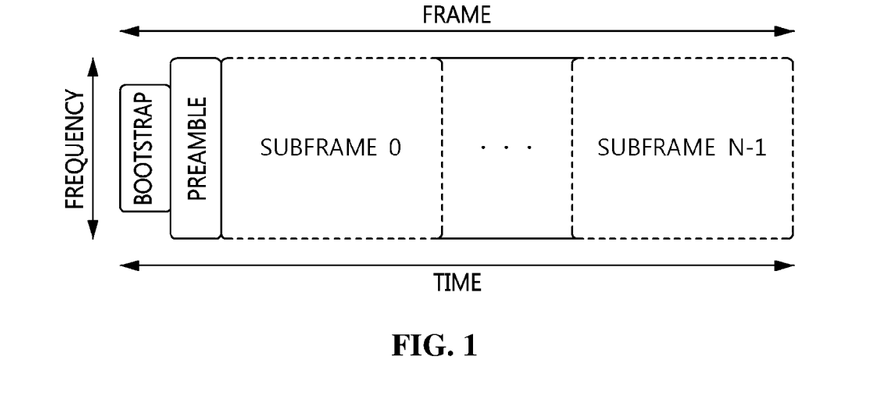
FIG. 1 is a view illustrating a data frame structure according to an embodiment of the present invention.

FIG. 1 is a view illustrating a data frame structure according to an embodiment of the present invention.

Referring to FIG. 1, a bootstrap signal may occupy a bandwidth narrower than the bandwidth occupied by a preamble and subframes following the bootstrap signal. The bootstrap signal includes four OFDM symbols, and the four OFDM symbols may use transmission parameters having fixed values, including a sampling rate of 6.144 Ms/sec, a bandwidth of 4.5 MHz, an FFT size of 2048, and a subcarrier spacing of 3 kHz, in order to enable the four OFDM symbols to be detected in any receiver.

Table 1 shows information transmitted using a bootstrap signal according to an embodiment of the present invention. The OFDM symbols of the bootstrap signal may transmit, for example, information illustrated in Table 1.

TABLE 1

| index | field name | number of bits | transmitted information |
|---|---|---|---|
| symbol #1 | ea_wake_up_1 | 1 | first emergency alert bit |
| | min_time_to_next | 5 | minimum interval until arrival of the next frame |
| | system_bandwidth | 2 | transmission bandwidth of the current frame |
| symbol #2 | ea_wake_up_2 | 1 | second emergency alert bit |
| | bsr_coefficient | 7 | baseband sampling rate of the frame transmitted following the bootstrap |
| symbol #3 | preamble_structure | 8 | OFDM symbol structure of preamble |

Referring to Table 1, it is to be understood that information is included in symbol #1 and symbol #2, which are the second and third symbols of the four bootstrap symbols. An encoding method for the bootstrap symbols is a bit-shift method, and is configured such that information in symbol #0, which is the first symbol, is not encoded, and the same symbol may be used in all of the frames in order to enable detection of the signal. Also, as shown in Table 1, symbol #1 and symbol #2, which are the second and third symbols, may include a wakeup signal for delivering disaster information, which is an example of information included in a broadcast signal. Because this information serves to wake up a receiver in a sleep mode in order to quickly propagate and handle the disaster information, symbol #1 and symbol #2, which are the second and third symbols, may include very important information that must be detected.

Therefore, in order to effectively detect specific information, such as a disaster signal, from a received broadcast signal, the present invention proposes an apparatus and method for detecting a broadcast signal, which are configured to demodulate disaster information by detecting a bootstrap signal, by estimating an offset, and by detecting the position of a symbol in which the disaster information is included.

Figure 2:
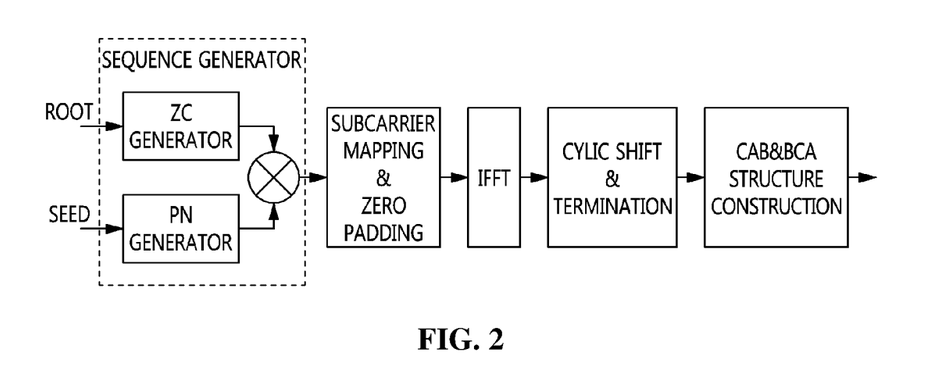
FIG. 2 is a block diagram illustrating a bootstrap signal generator according to an embodiment of the present invention.

FIG. 2 is a block diagram illustrating a bootstrap signal generator according to an embodiment of the present invention.

Referring to FIG. 2, the sequence generator of a bootstrap signal generator according to an embodiment of the present invention generates a bootstrap signal using random sequences generated in a frequency domain. Here, a Zadoff-Chu (ZC) sequence and a Pseudo-Noise (PN) sequence are used as the random sequences. The two random sequences may be generated by determining a root and a seed. For example, the version number of ATSC 3.0 is 0.0, where the former number indicates a major version and the latter number indicates a minor version.

The bootstrap signal generator may perform an IFFT operation after it performs signal-processing procedures such as subcarrier mapping and zero padding.

Here, before time-domain OFDM symbols are transmitted, the bootstrap signal generator may construct a CAB or BCA structure for each symbol in order to provide guard intervals.

Figure 3:
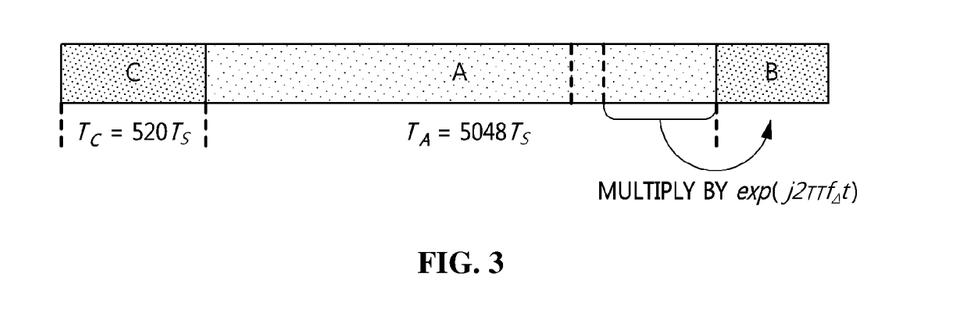
FIG. 3 and FIG. 4 are views illustrating guard intervals of a bootstrap OFDM symbol according to an embodiment of the present invention.
Figure 4:
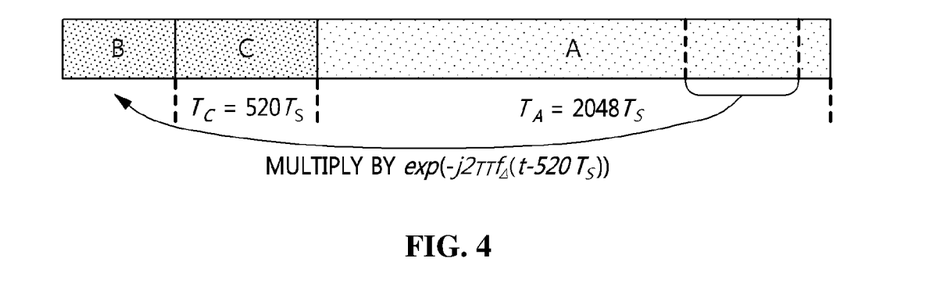

FIG. 3 and FIG. 4 are views illustrating the guard intervals of a bootstrap OFDM symbol according to an embodiment of the present invention.

Referring to FIG. 3 and FIG. 4, part A may be a time-domain signal in which a bit sequence is encoded, and parts C and B may correspond to guard intervals to which a portion of part A is copied. Here, among the above-described four bootstrap OFDM symbols, the first symbol may employ the CAB structure illustrated in FIG. 3 in order to generate a guard interval, and the remaining three symbols may employ the BCA structure illustrated in FIG. 4 in order to generate a guard interval.

Figure 5:
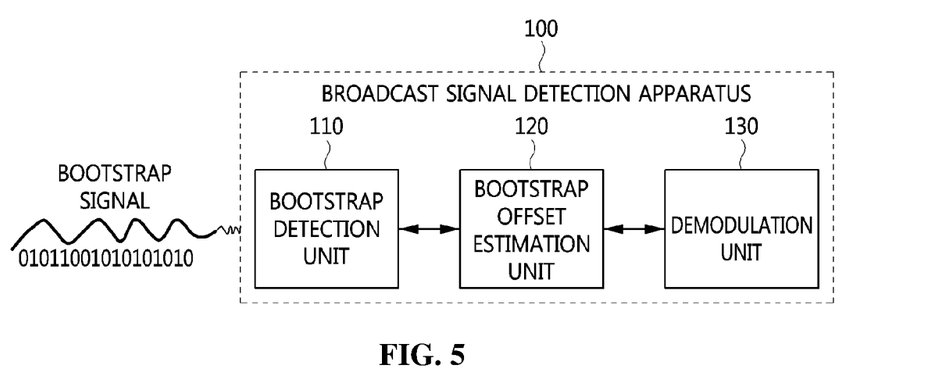
FIG. 5 is a block diagram illustrating an apparatus for detecting a broadcast signal according to an embodiment of the present invention.
Figure 6:
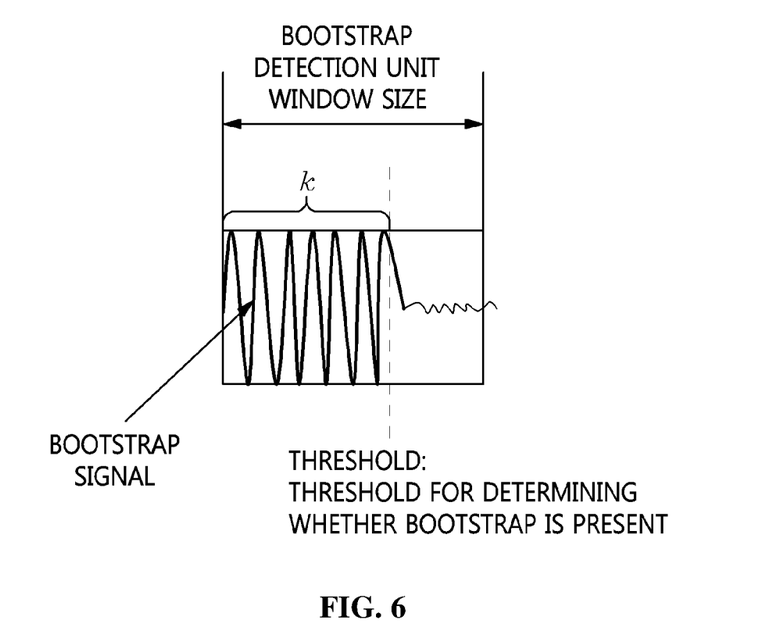
FIG. 6 is a view illustrating an example of the operation of a bootstrap detection unit according to an embodiment of the present invention.
Figure 7:
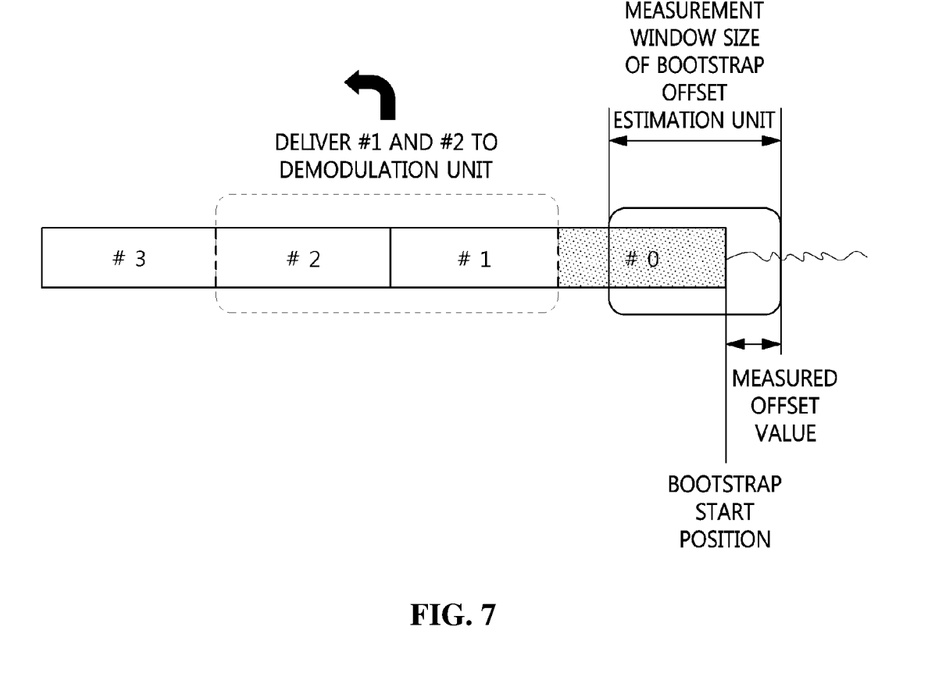
FIG. 7 is a view illustrating an example of the operation of a bootstrap offset estimation unit according to an embodiment of the present invention.

FIG. 5 is a block diagram illustrating an apparatus for detecting a broadcast signal according to an embodiment of the present invention. FIG. 6 is a view illustrating an example of the operation of a bootstrap detection unit according to an embodiment of the present invention. FIG. 7 is a view illustrating an example of the operation of a bootstrap offset estimation unit according to an embodiment of the present invention.

Referring to FIG. 5, an apparatus for detecting a broadcast signal according to an embodiment of the present invention includes a bootstrap detection unit 110, a bootstrap offset estimation unit 120, and a demodulation unit 130.

The bootstrap detection unit 110 may detect whether a bootstrap signal is included in a received broadcast signal based on a preset first bootstrap window and a machine-learning method.

In the broadcast signal, the first bootstrap signal($y_0$), in which a wireless channel and a Gaussian noise channel are included, may be represented as shown in Equation (1):

$$y_0 = h * x_0 + n \quad (1)$$

In Equation (1), $x_0$ may denote a zeroth transmitted time-domain bootstrap signal, h may denote a wireless fading channel, and n may denote white Gaussian noise. The time-domain bootstrap signal may have a sample length of 3072.

Here, the bootstrap detection unit 110 may determine whether a bootstrap signal is present.

Here, the bootstrap detection unit 110 may not perform any special operation when a bootstrap detector determines that there is no bootstrap signal in an environment in which a bootstrap signal is not transmitted.

However, in the situation in which a bootstrap signal is transmitted, the bootstrap detection unit 110 determines that the bootstrap signal is present, and may thus transmit the information about whether the bootstrap signal is included to the bootstrap offset estimation unit 120.

Referring to FIG. 6, the bootstrap detection unit 110 may use a window having a bootstrap time-domain sample length of 3072 as the preset first bootstrap window.

Here, when it receives a bootstrap signal having a length exceeding a preset threshold in the preset first bootstrap window, the bootstrap detection unit 110 may determine that the bootstrap signal is detected.

Here, the bootstrap detection unit 110 may set k as the threshold length for determining whether a bootstrap is present. Here, the bootstrap detection unit 110 may variously set the value of k in consideration of accuracy and complexity.

Here, the bootstrap detection unit 110 may separate a complex signal corresponding to the broadcast signal into a real part and an imaginary part and may output information about whether the bootstrap signal is included in the broadcast signal based on a result of applying inputs of the real part and the imaginary part to the machine-learning network, which is any one of a deep neural network (DNN) and a convolution neural network (CNN).

The bootstrap offset estimation unit 120 may search the broadcast signal for the start point of the bootstrap signal using a preset second bootstrap window, may estimate a bootstrap offset based on the machine-learning method, and may estimate bootstrap symbols from the bootstrap offset.

Here, the bootstrap offset estimation unit 120 detects the bootstrap offset value, thereby determining the bootstrap symbol corresponding to the position of the bootstrap signal.

Referring to FIG. 7, the bootstrap offset estimation unit 120 may discover the bootstrap start point using the preset second bootstrap window and measure the bootstrap offset value.

Here, the bootstrap offset estimation unit 120 may estimate symbol #1 and symbol #2, which are the first and second bootstrap symbols that include the information included in the broadcast signal, based on the bootstrap offset value, and may deliver symbol #1 and symbol #2 to the demodulation unit 130.

Here, the bootstrap offset estimation unit 120 may separate a complex signal corresponding to the broadcast signal into a real part and an imaginary part and may estimate the bootstrap offset from the broadcast signal based on a result of applying inputs of the real part and the imaginary part to the machine-learning network, which is any one of a deep neural network (DNN) and a convolution neural network (CNN).

Here, the bootstrap offset estimation unit 120 may estimate the first bootstrap symbol and the second bootstrap symbol, among the bootstrap symbols including the information included in the broadcast signal, based on the bootstrap offset.

Also, the bootstrap detection unit 110 and the bootstrap offset estimation unit 120 may be designed as a single block, and the determination of whether a bootstrap signal is present and offset estimation may be performed in a single function block.

The demodulation unit 130 may demodulate the information included in the broadcast signal from the bootstrap symbols based on the machine-learning method.

For example, the information included in the broadcast signal may be urgent and very important information, such as disaster information.

Here, the demodulation unit 130 may separate the first bootstrap symbol into a real part and an imaginary part, may separate the second bootstrap symbol into a real part and an imaginary part, and may demodulate the information included in the broadcast signal based on a result of applying inputs of real parts and imaginary parts of the first bootstrap symbol and the second bootstrap symbol to the machine-learning network, which is any one of a deep neural network (DNN) and a convolution neural network (CNN).

Also, the demodulation unit 130 may perform a response operation depending on the information included in the broadcast signal.

For example, when a disaster situation is determined based on the information included in the broadcast signal, the demodulation unit 130 performs the response operation, but otherwise, the demodulation unit 130 may request the bootstrap detection unit 110 to detect a bootstrap signal.

Figure 8:
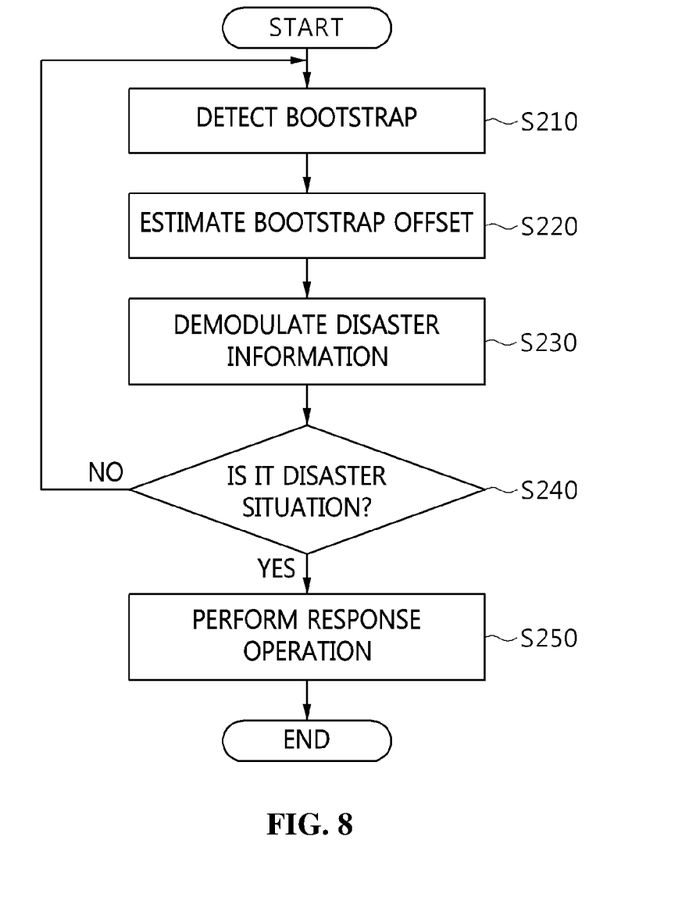
FIG. 8 is a flowchart illustrating a method for detecting a broadcast signal according to an embodiment of the present invention.

FIG. 8 is a flowchart illustrating a method for detecting a broadcast signal according to an embodiment of the present invention.

Referring to FIG. 8, in the method for detecting a broadcast signal according to an embodiment of the present invention, first, a bootstrap signal is detected at step S210.

That is, at step S210, whether a bootstrap signal is included in a received broadcast signal may be detected based on a preset first bootstrap window and a machine-learning method.

In the broadcast signal, the first bootstrap signal ($y_0$), in which a wireless channel and a Gaussian noise channel are included, may be represented as shown in Equation (1).

In Equation (1), $x_0$ may denote a zeroth transmitted time-domain bootstrap signal, h may denote a wireless fading channel, and n may denote white Gaussian noise. The time-domain bootstrap signal may have a sample length of 3072.

Here, at step S210, whether a bootstrap signal is present may be determined.

Here, at step S210, in an environment in which no bootstrap signal is transmitted, a bootstrap detector determines that there is no bootstrap signal, and may not perform any special operation.

However, in the situation in which a bootstrap signal is transmitted, the bootstrap signal is determined to be present, and information about whether the bootstrap signal is present may be delivered to the bootstrap offset estimation unit 120 at step S210.

Here, at step S210, a window having a bootstrap time-domain sample length of 3072 may be used as the preset first bootstrap window.

Here, at step S210, when a bootstrap signal having a length exceeding a preset threshold in the preset first bootstrap window is input, it may be determined that the bootstrap signal is detected.

Here, at step S210, k may be set as the threshold length for determining whether a bootstrap is present. Here, the bootstrap detection unit 110 may variously set the value of k in consideration of accuracy and complexity.

Here, at step S210, a complex signal corresponding to the broadcast signal may be separated into a real part and an imaginary part, and information about whether the bootstrap signal is included in the broadcast signal may be output based on a result of applying inputs of the real part and the imaginary part to the machine-learning network, which is any one of a deep neural network (DNN) and a convolution neural network (CNN).

Also, in the method for detecting a broadcast signal according to an embodiment of the present invention, a bootstrap offset may be estimated at step S220.

That is, at step S220, the broadcast signal may be searched for the start point of the bootstrap signal using a preset second bootstrap window, the bootstrap offset may be estimated based on the machine-learning method, and bootstrap symbols may be estimated from the bootstrap offset.

Here, at step S220, the bootstrap offset value is detected, whereby the bootstrap symbol corresponding to the position of the bootstrap signal may be determined.

Here, at step S220, the bootstrap start point may be discovered using the preset second bootstrap window, and the bootstrap offset value may be measured.

Here, at step S220, symbol #1 and symbol #2, which are the first and second bootstrap symbols that include the information included in the broadcast signal, may be estimated based on the bootstrap offset value, and symbol #1 and symbol #2 may be delivered to the modulation unit 130.

Here, at step S220, a complex signal corresponding to the broadcast signal may be separated into a real part and an imaginary part, and the bootstrap offset may be estimated from the broadcast signal based on a result of applying inputs of the real part and the imaginary part to the machine-learning network, which is any one of a deep neural network (DNN) and a convolution neural network (CNN).

Here, at step S220, the first bootstrap symbol and the second bootstrap symbol, among the bootstrap symbols including the information included in the broadcast signal, may be estimated based on the bootstrap offset.

Also, in the method for detecting a broadcast signal according to an embodiment of the present invention, the information included in the broadcast signal may be demodulated at step S230.

That is, at step S230, the information included in the broadcast signal may be demodulated from the bootstrap symbols based on the machine-learning method.

For example, the information included in the broadcast signal may be urgent and very important information, such as disaster information.

Here, at step S230, the first bootstrap symbol may be separated into a real part and an imaginary part, the second bootstrap symbol may be separated into a real part and an imaginary part, and the information included in the broadcast signal may be demodulated based on a result of applying inputs of real parts and imaginary parts of the first bootstrap symbol and the second bootstrap symbol to the machine-learning network, which is any one of a deep neural network (DNN) and a convolution neural network (CNN).

Also, in the method for detecting a broadcast signal according to an embodiment of the present invention, a response operation may be performed depending on the information included in the broadcast signal at steps S240 and S250.

That is, at step S240, when a disaster situation is determined depending on the information included in the broadcast signal, the response operation may be performed at step S250, but otherwise, the process may go back to step S210.

Figure 9:
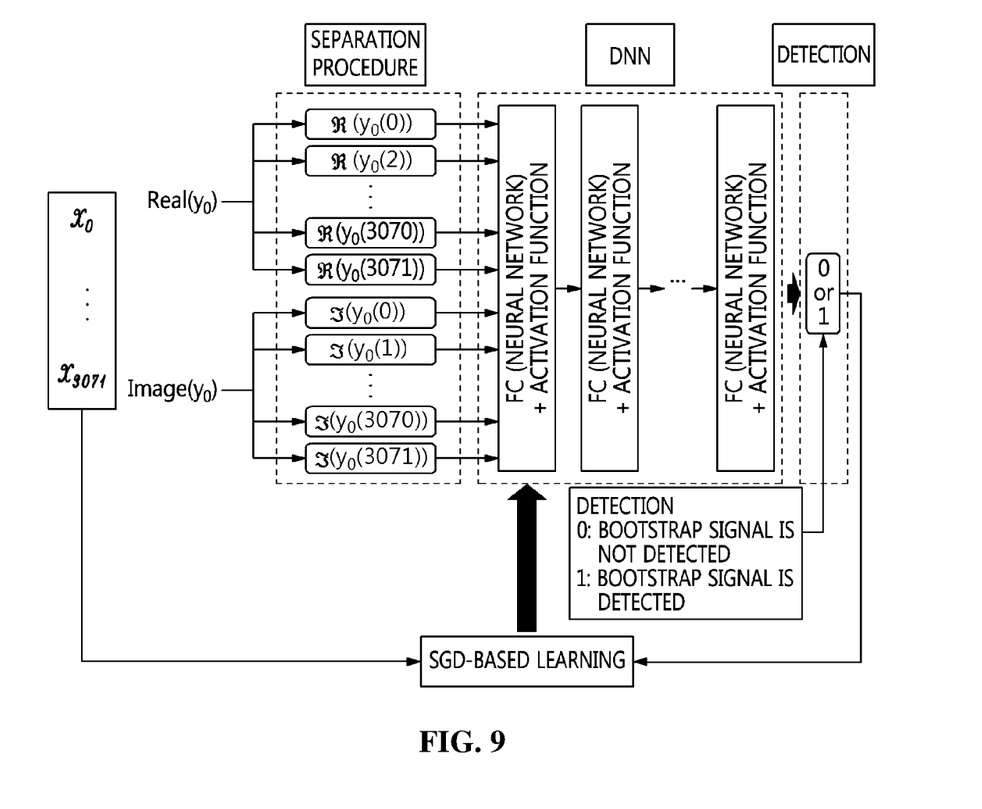
FIG. 9 is a view illustrating a process in which a bootstrap detection unit performs a detection operation based on a deep neural network (DNN) according to an embodiment of the present invention.
Figure 10:
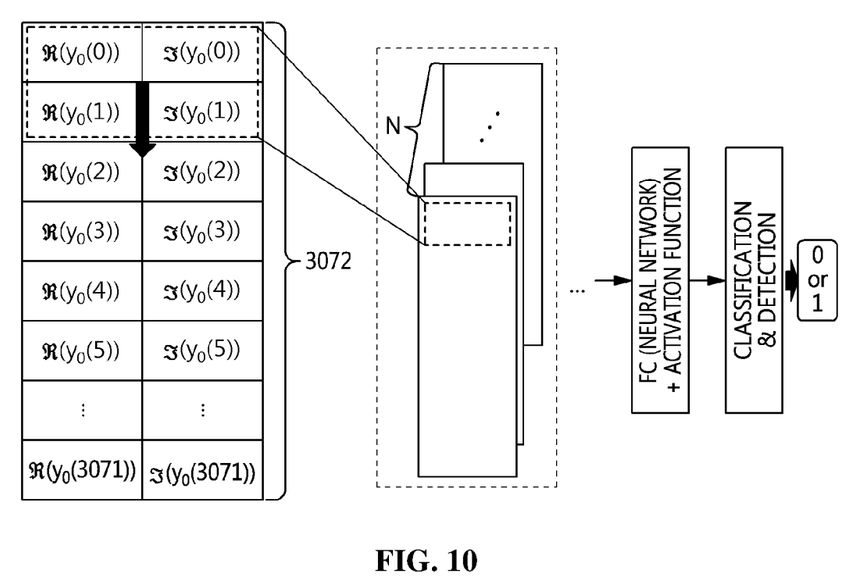
FIG. 10 is a view illustrating a process in which a bootstrap detection unit performs a detection operation based on a convolution neural network (CNN) according to an embodiment of the present invention.

FIG. 9 is a view illustrating a process in which a bootstrap detection unit performs a DNN-based detection operation according to an embodiment of the present invention. FIG. 10 is a view illustrating a process in which a bootstrap detection unit performs a CNN-based detection operation according to an embodiment of the present invention.

Referring to FIG. 9, the bootstrap detection unit 110 may perform an I/Q separation process for a received signal (the process of separating the signal into a real part and an imaginary part), as shown in Equation (1).

Here, DNN-based machine-learning functions are not suitable for processing complex-valued data. Therefore, the bootstrap detection unit 110 separates a received complex signal, which is based on I/Q data, into a real part and an imaginary part, thereby processing the separated parts as real numbers. Here, the bootstrap detection unit 110 arranges the real part and the imaginary part as a single column, thereby inputting data having a size of 6144×1 into a DNN block. Here, $R(y_r)$ is the real part of the r-th received signal $y_r$, and $\Im(y_r)$ is the imaginary part thereof. As described above, the signal separated into a real part and an imaginary part may be input to the DNN block. Then, the bootstrap detection unit 110 may perform a training operation based on a DNN. Here, the bootstrap detection unit 110 may represent the operation of each neuron as a fully connected (FC) function, and may perform an activation function operation in order to process the output of the neuron using a nonlinear function. Here, the activation function may use any of various conventional nonlinear functions for machine learning. For example, a conventional function such as ReLU, tanh, sigmoid, or the like may be used for the activation function. Accordingly, the bootstrap detection unit 110 may output only the result of determining whether a bootstrap signal is present. That is, the bootstrap detection unit 110 may output 1 when it determines that a bootstrap signal is present, and may output 0 when it determines that there is no bootstrap signal. Also, the bootstrap detection unit 110 may determine that a bootstrap signal is present when the bootstrap signal longer than a specific interval is input. Accordingly, the bootstrap detection unit 110 may perform training such that it determines that there is no bootstrap signal when a bootstrap signal shorter than the specific interval is input or when no bootstrap signal is input, and such that it determines that a bootstrap signal is present when a bootstrap signal longer than the specific interval is input. That is, the bootstrap detection unit 110 may perform training based on a cost, which is calculated as the difference from a transmitted value through a comparison therewith. Here, the bootstrap detection unit 110 may perform training so as to gradually decrease the difference of the coefficient of each neuron. The bootstrap detection unit 110 may use all of a Mean Squares Error (MSE) method, a cross entropy method, and the like to calculate the difference. Here, the bootstrap detection unit 110 may represent the output value in the form of a one-hot vector in order to use the cross entropy method. Also, the bootstrap detection unit 110 may perform training by updating the coefficient value using a Stochastic Gradient Descent (SGD) method or any of various methods changed therefrom. Here, when it uses a DNN-based machine-learning method, the bootstrap detection unit 110 arranges a complex signal having a length of 3072 as a signal having a size of 6144×1, thereby detecting a bootstrap signal.

Referring to FIG. 10, the bootstrap detection unit 110 may detect a bootstrap signal using a CNN method. When it processes multiple time-domain samples by filtering the same based on a CNN method, the bootstrap detection unit 110 may detect a signal even when the effects of a multipath channel, a frequency offset, or the like are present.

Figure 11:
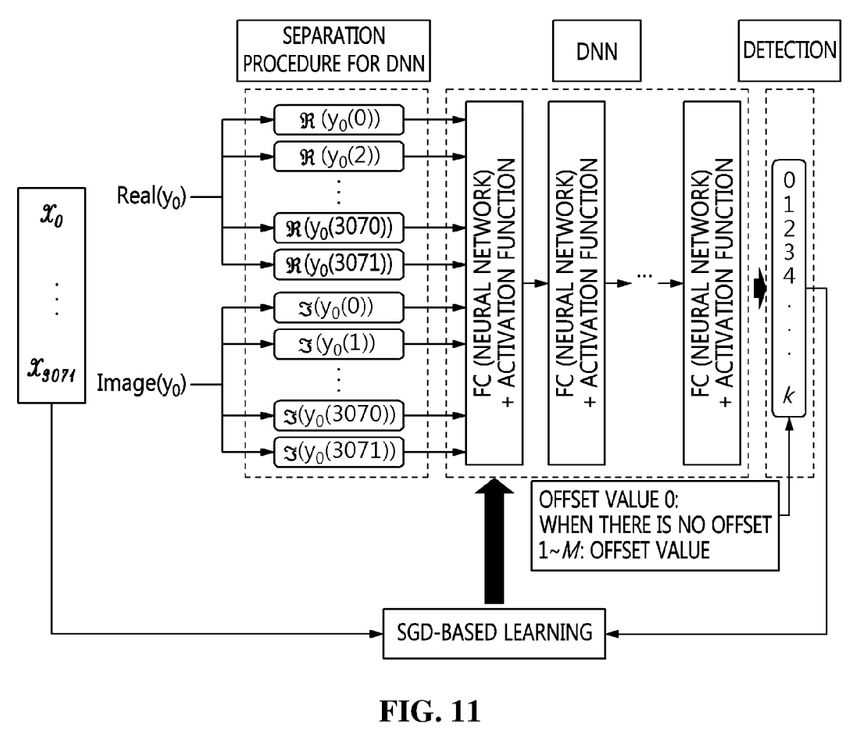
FIG. 11 is a view illustrating a process in which a bootstrap offset estimation unit performs an offset estimation operation based on a DNN according to an embodiment of the present invention.
Figure 12:
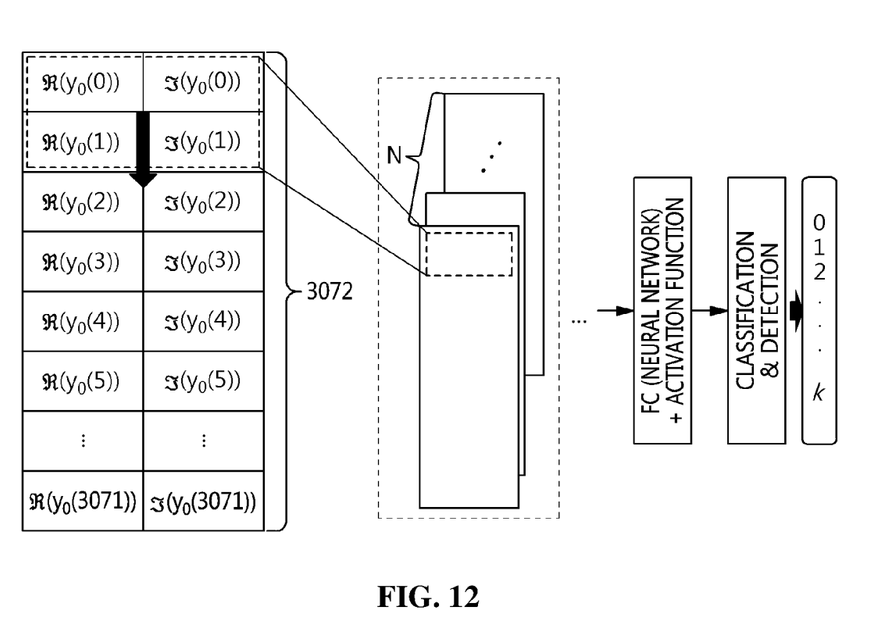
FIG. 12 is a view illustrating a process in which a bootstrap offset estimation unit estimates an offset based on a CNN according to an embodiment of the present invention.

FIG. 11 is a view illustrating a process in which a bootstrap offset estimation unit performs an offset estimation operation based on a DNN according to an embodiment of the present invention. FIG. 12 is a view illustrating a process in which a bootstrap offset estimation unit estimates an offset based on a CNN according to an embodiment of the present invention.

Referring to FIG. 11, the bootstrap offset estimation unit 120 may search for a bootstrap start point within a preset second bootstrap window, as shown in FIG. 7, and may estimate the number of time-offset samples. Here, when the bootstrap offset estimation unit 120 outputs 0, this corresponds to the case in which there is no time offset, and corresponds to the case in which the start point of the window matches the bootstrap start point. Here, the maximum offset value that can be estimated by the bootstrap offset estimation unit 120 may be equal to the value of k set by the bootstrap detection unit 110. Accordingly, the bootstrap offset estimation unit 120 may estimate an offset that ranges from 0 to k. Based on the estimated offset, the bootstrap offset estimation unit 120 delivers bootstrap symbol #1 and bootstrap symbol #2, in which a disaster signal is included, to a disaster information demodulator.

Referring to FIG. 12, the bootstrap offset estimation unit 120 may estimate a bootstrap offset based on a CNN method, and may exhibit better performance than when a DNN method is used.

Also, the bootstrap detection unit 110 and the bootstrap offset estimation unit 120 may be designed as a single block, and the determination of whether a bootstrap signal is present and offset estimation may be performed in a single function block.

Figure 13:
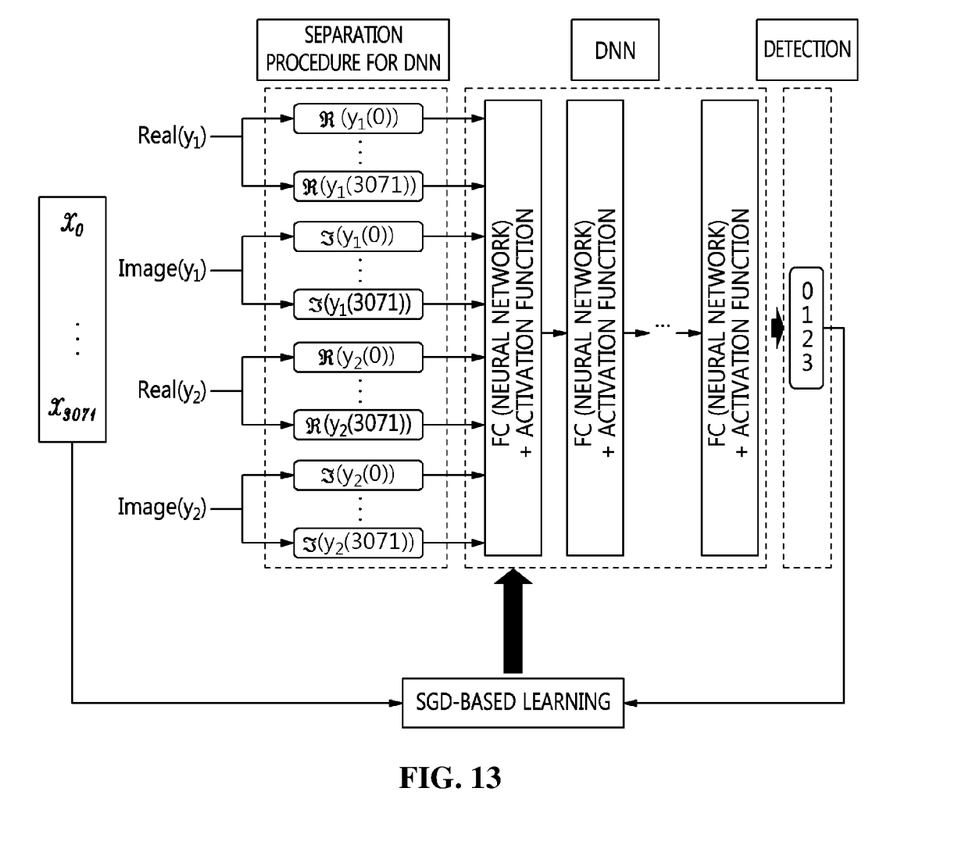
FIG. 13 is a view illustrating a process in which a demodulation unit demodulates information based on a DNN according to an embodiment of the present invention.
Figure 14:
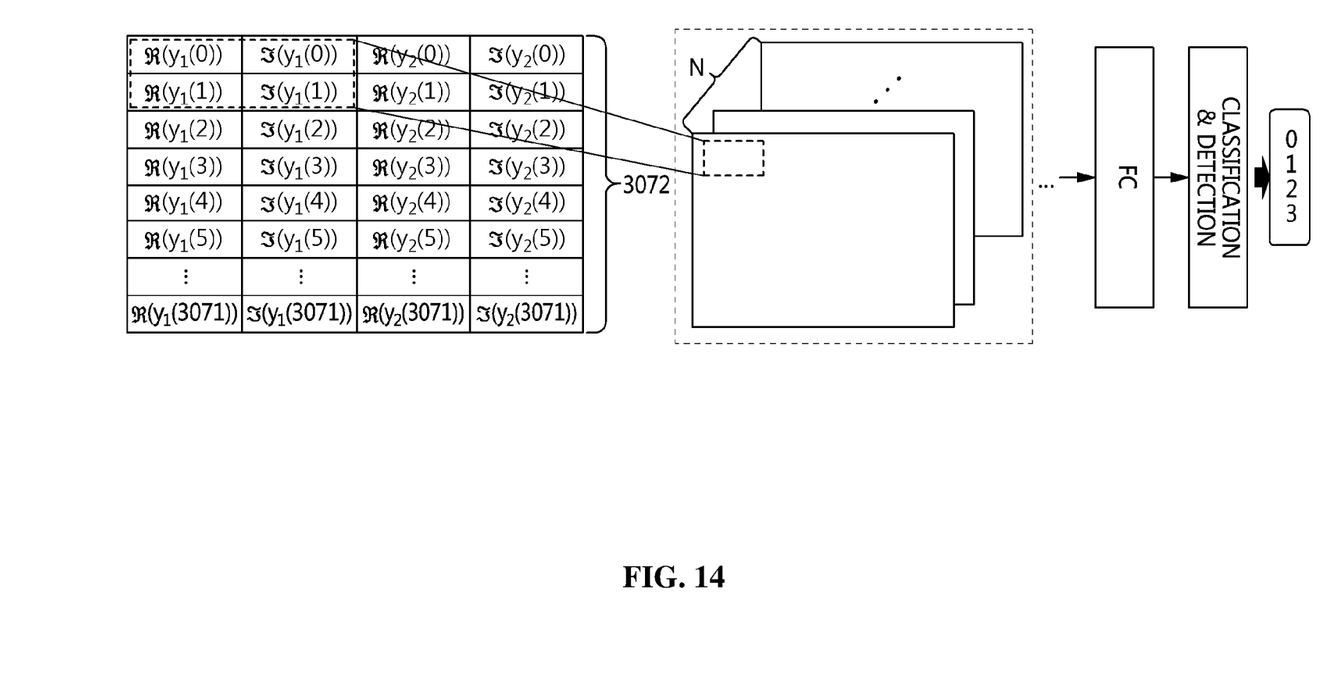
FIG. 14 is a view illustrating a process in which a demodulation unit demodulates information based on a CNN according to an embodiment of the present invention.

FIG. 13 is a view illustrating a process in which a demodulation unit demodulates information based on a DNN according to an embodiment of the present invention. FIG. 14 a view illustrating a process in which a demodulation unit demodulates information based on a CNN according to an embodiment of the present invention.

Referring to FIG. 13, the demodulation unit 130 may detect information included in a broadcast signal using the first and second bootstrap signals, which are delivered thereto, based on a DNN method or a CNN method. Disaster information may be included in symbol #1 and symbol #2, which are the first and second bootstrap symbols, in such a way that one bit is included in symbol #1 and the other bit is included in symbol #2, as shown in Table 1. Accordingly, symbol #1 and symbol #2 may include a total of four pieces of information, and the demodulation unit 130 may detect the four pieces of information. The demodulation unit 130 may be designed to have a structure similar to the structures of the bootstrap detection unit 110 and the bootstrap offset estimation unit 120. Here, the demodulation unit 130 receives a signal in which the real parts and the imaginary parts separated from symbol #1 and symbol #2, which are the two time-domain bootstrap symbols, are arranged in line, and the length thereof may be 3072×4. Also, the demodulation unit 130 may output one of values that can be represented using two bits, that is, a value ranging from 0 to 3. However, in the case of the DNN-based demodulation unit 130 illustrated in FIG. 13, a DNN structure may be designed in a very complicated manner because a very long signal is input at once. Also, training is time-consuming due to the large number of neural network coefficients, and overfitting, which results in optimization only for training signals, may occur. Therefore, the demodulation unit 130 may achieve better performance when it performs demodulation based on a CNN method. Referring to FIG. 14, the input of the CNN-based demodulation unit 130 has a form in which each of bootstrap symbol #1 and symbol #2 is separated into a real part and an imaginary part and the separated parts are arranged in parallel. The size of the input signal arranged as described above may be represented using 3072 rows and 4 columns. Here, the demodulation unit 130 performs a CNN operation on the input signal, thereby demodulating the input signal into one signal corresponding to one of four possible states. Also, the demodulation unit 130 may demodulate the entire bootstrap symbol #1 and symbol #2, each of which is modulated to 8 bits, rather than demodulating only a disaster signal. Here, when it demodulates the entire two symbols, each of which is configured with 8 bits, the demodulation unit 130 may output one of 64 possible states. Accordingly, the machine-learning-based demodulation unit 130 of an apparatus for detecting a broadcast signal according to an embodiment of the present invention may detect and demodulate an ATSC-based disaster signal even though it does not include an ATSC 3.0 demodulator.

Figure 15:
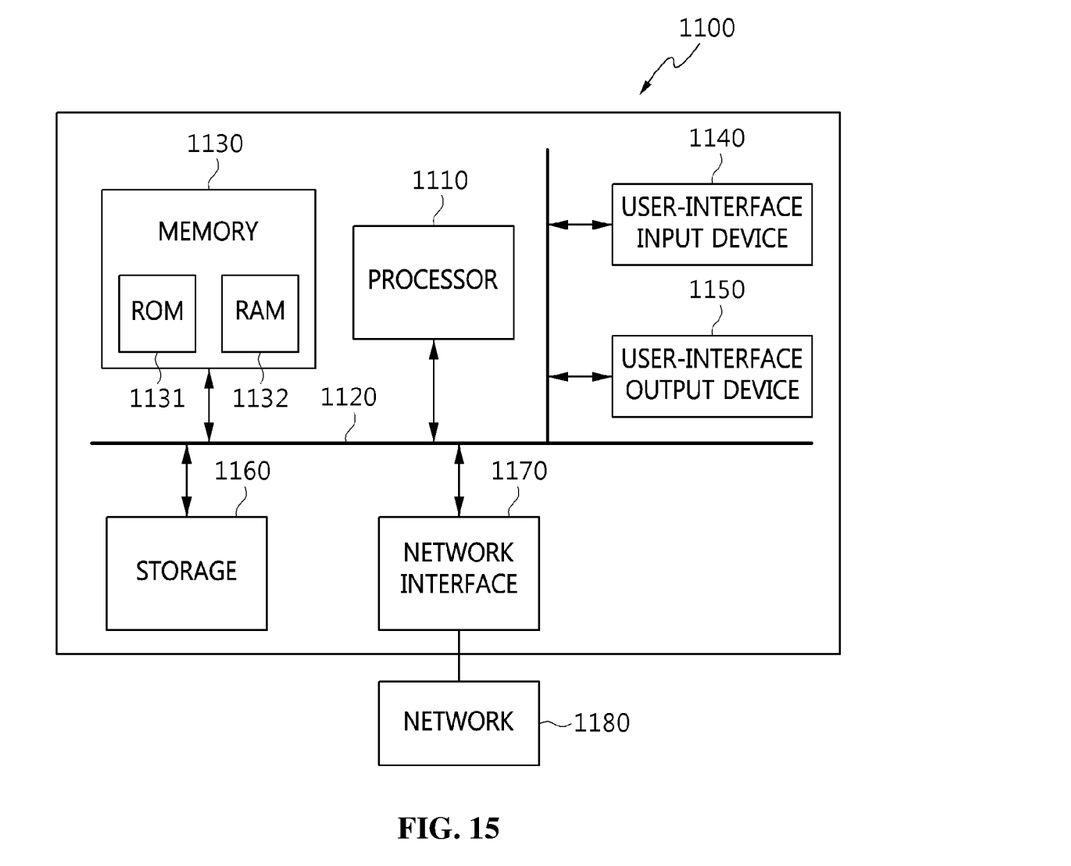
FIG. 15 is a view illustrating a computer system according to an embodiment of the present invention.

FIG. 15 is a view illustrating a computer system according to an embodiment of the present invention.

Referring to FIG. 15, the apparatus 100 for detecting a broadcast signal according to an embodiment of the present invention may be implemented in a computer system 1100 including a computer-readable recording medium. As illustrated in FIG. 15, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The present invention may provide detection of a bootstrap signal, estimation of a bootstrap offset, and demodulation of information in an effective manner.

As described above, the apparatus and method for detecting a broadcast signal according to the present invention are not limitedly applied to the configurations and operations of the above-described embodiments, but all or some of the embodiments may be selectively combined and configured, so that the embodiments may be modified in various ways.

What is claimed is:

1. An apparatus for detecting a broadcast signal, comprising:
 a bootstrap detection unit for detecting whether a bootstrap signal is included in a received broadcast signal based on a preset first bootstrap window and a machine-learning method;
 a bootstrap offset estimation unit for searching the broadcast signal for a start point of the bootstrap signal using a preset second bootstrap window, estimating a bootstrap offset based on the machine-learning method, and estimating bootstrap symbols from the bootstrap offset; and
 a demodulation unit for demodulating information included in the broadcast signal from the bootstrap symbols based on the machine-learning method.

2. The apparatus of claim 1, wherein the bootstrap detection unit separates a complex signal corresponding to the broadcast signal into a real part and an imaginary part and outputs information about whether the bootstrap signal is included in the broadcast signal based on a result of applying inputs of the real part and the imaginary part to the machine-learning network, which is any one of a deep neural network (DNN) and a convolution neural network (CNN).

3. The apparatus of claim 1, wherein the bootstrap offset estimation unit separates a complex signal corresponding to the broadcast signal into a real part and an imaginary part and estimates the bootstrap offset from the broadcast signal based on a result of applying inputs of the real part and the imaginary part to the machine-learning network, which is any one of a deep neural network (DNN) and a convolution neural network (CNN).

4. The apparatus of claim 3, wherein the bootstrap offset estimation unit estimates a first bootstrap symbol and a second bootstrap symbol, among the bootstrap symbols that include the information included in the broadcast signal, based on the bootstrap offset.

5. The apparatus of claim 4, wherein the demodulation unit separates the first bootstrap symbol into a real part and an imaginary part, separates the second bootstrap symbol into a real part and an imaginary part, and demodulates the information included in the broadcast signal based on a result of applying inputs of real parts and imaginary parts of the first bootstrap symbol and the second bootstrap symbol to the machine-learning network, which is any one of a deep neural network (DNN) and a convolution neural network (CNN).

6. A method for detecting a broadcast signal, performed by an apparatus for detecting the broadcast signal, comprising:
 detecting whether a bootstrap signal is included in a received broadcast signal based on a preset first bootstrap window and a machine-learning method;
 searching the broadcast signal for a start point of the bootstrap signal using a preset second bootstrap window, estimating a bootstrap offset based on the machine-learning method, and estimating bootstrap symbols from the bootstrap offset; and
 demodulating the information included in the broadcast signal from the bootstrap symbols based on the machine-learning method.

7. The method of claim 6, wherein detecting whether the bootstrap signal is included is configured to separate a complex signal corresponding to the broadcast signal into a real part and an imaginary part and to output information about whether the bootstrap signal is included in the broadcast signal based on a result of applying inputs of the real part and the imaginary part to the machine-learning network, which is any one of a deep neural network (DNN) and a convolution neural network (CNN).

8. The method of claim 6, wherein estimating the bootstrap offset is configured to separate a complex signal corresponding to the broadcast signal into a real part and an imaginary part and to estimate the bootstrap offset from the broadcast signal based on a result of applying inputs of the real part and the imaginary part to the machine-learning network, which is any one of a deep neural network (DNN) and a convolution neural network (CNN).

9. The method of claim 8, wherein estimating the bootstrap offset is configured to estimate a first bootstrap symbol and a second bootstrap symbol, among the bootstrap symbols that include the information included in the broadcast signal, based on the bootstrap offset.

10. The apparatus of claim 9, wherein demodulating the information is configured to separate the first bootstrap symbol into a real part and an imaginary part, to separate the second bootstrap symbol into a real part and an imaginary part, and to demodulate the information included in the broadcast signal based on a result of applying inputs of real parts and imaginary parts of the first bootstrap symbol and the second bootstrap symbol to the machine-learning network, which is any one of a deep neural network (DNN) and a convolution neural network (CNN).

* * * * *